United States Patent Office 2,798,019
Patented July 2, 1957

2,798,019

STRUCTURAL BOARD

Jean Verbestel, Forest, Brussels, Belgium, assignor to Compagnie Internationale de Brevets et Licences, Luxembourg, Luxembourg, a corporation of Luxembourg No Drawing. Application September 12, 1952, Serial No. 309,367

12 Claims. (Cl. 154—45.9)

This invention relates to structural boards made from flax shives, to new methods of preparing flax shives for such use, and to new methods of making structural boards from such prepared flax shives. It relates particularly to structural boards made from a plurality of thin, flat, flax shives oriented with their greatest surfaces parallel to each other and to the greatest surfaces of the board, each shive being randomly oriented in the plane of its greatest surface with respect to the other shives, and bonded together in this arrangement in the board. It also particularly relates to methods of preparing thin, flat, flax shives which are relatively free of soluble or hydrolizable material, and also relatively free of broken or cut capillary tubes, and to methods of making structural boards from such prepared flax shives, with the shives oriented in the board as aforesaid, and bonded therein with a relatively small amount of adhesive.

It is an object of this invention to provide such structural boards having remarkable average strength in two dimensions while requiring an exceptionally small proportion of adhesive to unify the board.

It is a further object to provide novel methods of preparing flax shives for use in such boards, and novel methods of preparing the boards from such flax shives whereby the boards have excellent dimensional stability under conditions of varying humidity and are relatively immune to attack by fungi and other micro-organisms. Such boards are inexpensive to manufacture because the principal material used to make them has been previously considered to be waste and is therefore cheap. The boards have a very attractive appearance since the flax shives have a lovely yellow color under the smoothly finished surface of the board, and the color and pattern of the shives is visible on the surface of the finished board.

Heretofore the fiber has been considered the valuable part of the flax plant, but the woody portion is larger and affords a greater yield of material. It may be in the future that the flax plant will be grown for its woody portion, and thus what is now considered waste will come to be considered the most important product.

Generally, there are two principal types of structural boards, excluding multiplex and laminated boards made from veneers and block boards made by assembling small tongues of wood. The two principal types are felted boards and bonded boards.

Felted boards are well known and have long been successfully manufactured and used. These boards are made from long fibers of wood, from bagasse or cereal straw. Felted boards are manufactured by a modification of the methods used in making paper and cardboard in which the plant is ground to pulp and mixed in a water slurry.

After grinding, the pulp is refined and purified and then bonding, water proofing, fire proofing, insect proofing materials are added and the pulp with its additives is drawn out in a sheet on to a modified Fourdrinier machine.

For the manufacture of light-weight porous boards, the sheets are dried by a continuous dryer. In hard board manufacture the sheet is generally dried in a high pressure hydraulic press fitted with multiple steam heated plates. In the most modern installation such hard boards are partially dried in a continuous dryer and then compressed in a hydraulic press after high frequency heating.

All of the aforementioned wet processes of manufacturing felted boards possess important disadvantages, of which a few are as follows:

a. The manufacturing installations are large and costly, both as to the board making machinery and as to its necessary accessories, including the boilers, generators, water purifying units, etc.

b. The necessity for getting rid of the large quantities of water present in the pulp by compression and drying, does not permit economical production of hard boards thicker than 6 mm. or porous boards thicker than 13 mm. The manufacture of thicker boards in either class gives rise to much higher cost and disproportionate difficulties in manufacture.

c. The consumption of fuel and power to grind the material to a pulp and to heat the boards and presses to evaporate the water in the boards is very high.

d. A large part of the resins and chemical additives used to bond the board and give additional desired characteristics to the boards is lost in the water removed from the pulp.

e. Production costs are high because of the rapid wear of the grinding machine discs, the paper machine felts, and the wire gauze used in the presses.

f. Such boards have a foliated appearance and are clearly stratified and similar in structure to that of compressed cardboard. The low mechanical strength of these boards and the difficulty of shaping them with the usual wood-working tools generally makes them fit for use only as interior insulating boards.

g. Such boards contain large amounts of hydrated cellulose causing the finished boards to be unduly hygroscopic.

h. The mechanical processes involved in the manufacture of these boards do not permit the economical use of waste matter, such as sawdust or wood shavings, straw or rice husks, etc.

The second type of boards, the bonded boards, generally contain two constituents; crushed or cut cellulosic matter and an adhesive. Enormous quantities of sawdust exist throughout the world and for a long time it was thought that such waste material could be used for making bonded boards by mixing a quantity of adhesive with the sawdust and pressing the mix into a board. However, experience has proven that such boards are very costly to make owing to their high consumption of adhesive. Moreover, their quality is mediocre. Such bonded boards suffer from a basic defect. If the particles to be bonded together are large, then a pitted, rough surfaced board is obtained. Few of the large particles are in direct contact with each other and the whole structure lacks solidity and strength. On the other hand, if the particles of wood are very small, the capillary tubes in the wood are exposed along the cut edges and broken portions and, therefore, the adhesive consumption is huge owing to its being soaked up by the capillary tubes.

In a more recent process for using wood in manufacturing bonded boards, the wood is cut into very thin lamellae and an attempt is made to insure that the lamellae are cut parallel to the fibers of the wood so as to reduce the number of capillary tubes exposed. This process is feasible only with wood that has been carefully sorted and is of appropriate dimensions. Thus the process is expensive and the amount of adhesive consumed remains rather high.

Attempts have been made to use cereal straws, such as rice husks, maize, corn chaff, etc., but the results are unsatisfactory. Boards made from these materials contain a high proportion of soluble or hydrolizable material whereby they are subject to deterioration by attack from micro-organisms when subjected to humid conditions.

In the present invention flax waste, or what has been previously considered to be waste from the flax plant, is used as a material for the manufacture of boards. The selection of this material is based on a thorough study of the chemical and physical properties which a material intended for use in a bonded board must possess, and on the development of a manufacturing process to produce a material having such properties. Experience shows that only a material shaped like a thin, flat sheet or extremely thin lamella, with all its fibers or capillary tubes running lengthwise in the sheet, and thereby having a minimum number of such tubes cut, can produce a satisfactory bonded board with the use of an economical amount of adhesive. Materials having the shape of a thin, flat sheet or small lamella can be oriented in the board in such a way as to produce contacting surfaces of maximum area, which is a great advantage in the bonding operation. If the average thickness of the lamellae is extremely small, of the order of about 0.1 mm., it is possible to have the average length and width quite large without causing the board to have a heterogeneous cross-section or a rough surface. By using lamellae of the aforementioned size, maximum benefit is obtained in the finished board from activation of the natural adhesives present in the raw material. Considering particles of a weight of a few milligrams, 1 sq. foot in a board of ¾ inch thick contains about 200,000 lamellae.

This particular thin flat shape can be obtained from any plant, but in certain plants other characteristics which are undesirable make the material unsatisfactory. For example, in wood the number and size of capillary channels is very great so that when wood is cut into fine lamellae, a large number of capillary channels are opened. Moreover, almost all the cells at the cut surface have been crushed by the cutting operation whereby the resultant material is very porous and absorbs great quantities of adhesive.

Lamella-like shapes can be obtained from cereal straws or rice husks but unfortunately, this material contains soluble and hydrolizable matter which micro-organisms can decompose. These materials are also covered with a waxy cuticle which has no affinity for adhesives and the presence of which is extremely undesirable in the bonding operation.

As aforesaid, this particular lamella shape cannot be obtained from wood without cutting across a large number of capillary channels, due to the lack of parallelness between the fibers and capillary channels as well as the difficulty in aligning the cutting knives. It is only by splitting a plant stem along its zones of natural minimum resistance that one can expect to obtain lamellae whose fibers and capillary channels run parallel to its greatest surface.

In the flax plant microscopic examination shows that the skeleton in the stem is naturally thin whereby the connections between the various rings in the woody stems are weak and close together and thin lamellae may be readily split therefrom.

The flax plant is an annual plant, growing to a height of two feet. The stem comprises a central cylinder of pith surrounded by a cylinder of woody material, around which is the cambium or growing layer, in turn surrounded by the cortex layer which contains the fiber bundles. The external layer is a thick layer called the epidermis.

It is the woody portion of the stem minus the pith which is used in this method of making flax shives. The woody portions of the stems have a relatively low moisture content, averaging about 7.8%, but the content of lignin in relation to the content of the cellulose is extremely high. The lignin content averages about 21% while the cellulose content averages about 40%. The woody portion of the stem also contains about 33% of pentosanes which is an advantage, for when the unification of the board takes place at high temperatures and the raw material is in an acidic state, a portion of these pentosanes will be converted to furfural, which is a valuable product and helps to maintain the dimensional stability of the finished board.

In order to weaken the adherence between the woody portion of the stem and the external cortex, fibres and epidermis, the flax plants can be treated biochemically or chemically. If the stems are wetted and permitted to stand, the microorganisms which are naturally present on the flax plant and on the soil and dust adhering to it, attack the cambium layer. The needed moisture can be provided by rain, dew or by spraying. A better, but more expensive way, is to soak the plants in warm water, in the same manner as is done for textile linen fibres. In some cases, for low grade material, the woody portion is separated from the external layers without special biochemical action.

The stem is dried until a moisture content of about 10% is obtained. Then the stem is rehumidified just before subsequent processing so that the external layer composed of the epidermis, cortex and the fiber bundles attains a moisture content of about 15 to 20%. This rehumidifying, just before processing, is done in order to obtain a wet external layer and a dry internal woody part. The internal woody portion must be broken cleanly and not crushed and at a kiln dry state the elasticity of the internal part is low and a clean break is obtained. The external portion is wetted because it is easiest to separate the internal and external portions when the layer of deteriorated cambium cells has been wetted. The stem is then passed through a breaking machine, which due to the moisture conditions prevailing in various portions of the stem, cleanly breaks the stem and does not deteriorate or crush the cells of the woody portion of the stem. Thus no capillary tubes are opened except those at the end of each broken piece of stem. The corrugated rollers of the breaking machine are arranged so as to break the straw into pieces having an average length of from 18 mm. to 24 mm. The breaking machine strips the woody portion of the stem free from the other portions.

The resultant material then goes through a scutching machine where the stem material is segregated into two parts, (1) the long tow, which is segregated out, and (2) the shives combined with additional matter, which is the material that is used in the hereinafter described process. However, it must be understood that along with the shive material there is a mixture of loose cells, epidermis, cortex particles, short fibers, dust, soil particles and broken wooden stems and roots. The content of usable shives ordinarily does not exceed 70% of this material.

The shives now undergo a cleaning process to eliminate dust, loose cells, soil particles, and other small particles. Their presence is undesirable for several reasons:

a. The soil particles are often mineral particles including silica, and calcium carbonate. The silica particles are harmful to tools and the calcium carbonate, due to its alkalinity, may act as a negative catalyst during the condensation of the carbamic resins.

b. Loose cells, cuticle, epidermis cells, and pith particles and other small particles take up large quantities of adhesive, which is undesirable. They also tend to segregate out on the bottom side of the manufactured board. Thus they make the cross-section of the board non-uniform and may cause it to warp.

The aforementioned dust, small particles and loose cells are separated from the shives by being passed over perforated plates in a large drum. The perforations in the plates have an average size of 0.5 mm. diameter at the top of the plate and the perforations increase in width toward the bottom of the plate. A current of air passes down through the perforations carrying the aforementioned smaller particles etc. with it.

The cleaned shives still contain a mixture of loose or attached small fibers. It is desirable to separate these fibers out because they absorb adhesive and also have a tendency to agglomerate into mats causing stains on the finished board and preventing a uniform filling of the frames in which the boards are pressed. The shives containing these fibers are placed in a horizontal cylinder. At the bottom of the cylinder is a perforated plate. The perforations are rectangular in shape, and their dimensions are about 20 mm. long and 3 mm. wide. The long dimension of each of the perforations is aligned parallel to the generatrix of the cylinder.

Within the cylinder is a horizontal rotor on which metallic pins are fixed at spaced intervals in an helicoidal arrangement ascending along the rotor. The rotational speed of the rotor is adjustable. The shives and mixed-in fibers are introduced into the cylinder on one side. Under the impetus of the pins on the rotating rotor, which comb through the fed-in mass the fibers hook together, agglomerate and form mats. In some cases, agglomeration is speeded by mixing into the mass a small quantity of long fibers, up to 5% by weight, in order to cause the formation of the mats. The mat or mats travel forward under the impetus of the pins while the shives separate therefrom. The mat or mats is rotated and agitated by the pins and rotor. The shives fall out of the mats and through the perforated plate, and the fiber mats come out of the cylinder through the open top.

The collected defibered shives still contain heavy root pieces which are much thicker than the shives. It is desirable to separate these heavy root pieces out.

The material is therefore passed down polished inclined plates. A lateral current of air is blown across the plates, the current is strong enough to pick up and carry along the thin shives but does not pick up the heavy root pieces and cereals straw which fall down the plates.

The shives, freed of the root pieces, are collected and passed through a cylinder roller in order to flatten any cylindrical parts of the stem which have escaped the above-described segregation process.

The resultant product is a plurality of clean shives, free from heavy root pieces, fibers and deleterious material. The average weight of a single particle being 5 mgrs., the specific surface of an average type of shives is 150 cm.$^2$ per gr. Microscopic examination shows that the above-described process produces shives that have been broken along the natural lines of cleavage in the woody portions of the stem whereby the capillary tubes are parallel to the sides of the shive and are broken only at the ends of the shive. In addition, the shives are free of easily soluble and hydrolizable material.

The structural boards made with the above-described flax shives may be bonded with various types of adhesives including thermo-setting resins, such as phenol-formaldehyde, urea-formaldehyde, triazine, allyl, etc. The shives may also be bonded with adhesives that are not of a thermo-setting type.

When a urea-formaldehyde type of resin is used, it has been found beneficial to first acidify the resin mixture in order to avoid having a resin of low viscosity. Thereafter the mixture may be neutralized by the addition of a suitable base. Brittleness of the aforementioned thermo-setting resin may be avoided by adding a plastifier, for example, about 2% by weight of diglycolstearate, in finely divided form, to the resin solution. The diglycolstearate also improves the thermo-setting resin by increasing its viscosity at high temperature, such as are encountered in the pressing operation, sufficiently to avoid penetration.

Structural boards made with light pressure so as to have a lower specific gravity require more adhesive than heavy boards. In light boards the resins may be extended by being mixed with about 20% by weight of slate flour and having water up to 50% additional by volume added. The average weight of dry resin employed in the manufacture of boards in accordance with this invention is about 5% of the weight of the finished board.

To avoid any penetration of the bonding solution into the shives by diffusion, it is necessary to have solutions of high viscosity: 1,000 cps. and more.

But for spraying it in the smallest drops, the solution must be of low viscosity. To overcome this opposition, the spray gun is heated in order to decrease momently the viscosity of the solution.

The process of manufacturing structural boards from the previously described flax shives by the use of an adhesive in accordance with this invention is as follows:

Depending on whether the board is to be impregnated with materials to plastify the cellulosic material, or convert the pentosane to furfural, or give fire-resistant qualities, the manufacturing process may include or exclude an impregnation step.

This impregnation step is separate from the adhesive coating because the infusion of the impregnating chemicals into the flax shives requires considerable time. It is obviously undesirable to combine the slow chemical impregnation process with the shive coating process because it is desirable to dry the adhesive or resin soon after coating in order to avoid penetration of the adhesive into the shives.

To accomplish the impregnation, the flax shives are stored in a bin or storage pit whose bottom and one adjoining wall is formed by a continuous carrier belt provided with transverse, bucket-shaped, carrier elements adapted to carry a quantity of shives vertically and horizontally. Due to the shape of the flax shives, bins of the usual shape are not satisfactory because the flax shives have a tendency to form bridges amongst themselves which cause non-uniform distribution of the shives in the pit. The storage pit, as above described, permits uniform quantities of shives to be picked up and transported by the carrying elements of the belt and the movement of the carrier belt reduces bridge-making among the shives by vibrating the mass in the pit. The shives are transported by the carrier belt to the impregnating machine which is supplied with a volumetric pump for spraying solutions. The motor of the pump in the impregnating machine and the drive motor for the carrier belt are of the variable speed type and are both adjustable so that the rate of feed of the shives may be correlated to the rate of spraying the solution.

The impregnating machine is of generally cylindrical shape, having a driven shaft running along its length near the bottom of the machine. The shaft has a plurality of disks inclined at various angles concentrically affixed to it along its length. The flax shives are fed into the machine near one end of the shaft. As the shaft rotates the flax shives are thrown into the air above the shaft by the inclined discs. The impregnating solution is sprayed into the air above the rotor and wets the flax shives. The coated wet shives travel to the bottom of the mass while the dry particles move to the top of the mass and are thrown back into the air in order to be sprayed. The wet shives are picked up by a belt running along the bottom of the machine and transported back to a storage pit of the type previously described where they are stored for a sufficient amount of time to permit the solution to impregnate the shives.

If the shives are not to be impregnated, the preceding step is omitted. Thus, whether the shives are untreated or have been impregnated and permitted to stand in the storage pit, the remainder of the process for producing a structural board in accordance with this invention is the same and is as follows:

The shives, whether impregnated or not, are transported from the storage pit by the carrier belt as previously described and transported into a chamber identical with the one described for the impregnating of the shives. Now, however, the shives are sprayed with an adhesive solution.

The amount of adhesive sprayed upon the shives is again controlled by the relative speed of the motor powering the carrier belt and the motor powering the pump which sprays the adhesive. The proper amount of adhesive sprayed upon an unity of weight of the shives depends not on the specific weight of the shives but on their specific surface which is a factor of the initial thickness of the shives.

The specific surface is determined for each lot of flax shives by a test which consists in measuring the amount of a beam of incident light absorbed by passage through a defined area of an unpolished glass on which a standard weight of shives is perfectly well sprayed in a single mat. This absorption is compared with the results obtained in the same condition with a standard sample:

Experience shows that generally a satisfactory amount of adhesive is employed when its total dry weight averages about 5% of the weight of the finished board, for shives having a specific surface of 150 $cm.^2$.

As soon as the flax shives have been coated with the desired amount of adhesive they are rapidly transported into a drier for rapid drying to avoid penetration of the adhesive into the shive. The drier is a chamber having a rotor which moves the flax shives along the length of the chamber while hot air in blown through the mass of shives. It generally requires only a few minutes for the shives to attain about a 10% moisture content.

The shives coated with dried adhesive flow out of the drying chamber into a vibrating feeder. The front of the feeder is open and the mass of shives pass under a plurality of picket rollers located above it.

The picket rollers are adjustable for height so as to control the thickness of the mat layed up on the feeder and also to reduce any bridges amongst the mass of shives. The feeder passage has a planar bottom and is vibrated transversely. The amplitude of vibration controls the speed of travel of the mat of shives along the feeder and at the same time orients the shives in the mat with their flat or greatest surfaces generally parallel to each other and to the planar bottom of the passage, but each shive, although having its flat or greatest surface generally parallel to the bottom of the passage is randomly oriented in the plane of its flat or greatest surface with respect to the other shives whereby each shive overlaps the greatest surfaces of neighboring shives and contacts them at said overlapping greatest surfaces. The volume of feeded shives is determined by the position of the picket rollers and the amplitude of vibrations of the feeder.

The preformed mat of shives is fed to a prepress feeding belt. On the belt are side frames which are hooked one to the other, making a continuous chain. The frames lie on polished stainless bottom plates. The frames have to support the edges of the unpressed mat, which in some cases, has a height of one foot. The belt conveys the empty frames under the end of the vibrating feeder at a constant and controlled rate of speed in order to get a perfectly even and homogeneous filling in each frame. As soon as a frame is filled it is transported to the prepress. The prepress is a rapid vertical down stroke hydraulic press. The mat is pressed in the prepress to a thickness about twice the thickness of the finished board. The press generally works on a pressure of about 300 p. s. i. As the mat is pressed the side frames are freed from the polished bottom plates. As the press is opened the frame is separated from the prepressed board and its bottom plate. The mat and bottom plate are then conveyed to a head press. Approximately 20 prepressed boards are loaded into the head press in each charge. The head press is a heated one and the pressing time varies from 10 minutes to 30 minutes depending on the thickness and weight of the board. The time required in the press is determined by the time necessary to cure the adhesive and to permit water vapor to escape.

Generally the board is maintained in the head press at a temperature of about 140° centigrade for 15 minutes which treatment at this elevated temperature serves to permanently reduce the subsequent swelling and shrinking of the shives and the board under varying conditions of humidity. In addition, the high temperature converts a part of the pentoses to furfural. Also if the adhesive contains formaldehyde the high temperature causes it to react with lignin and the hydroxycellulose. Both the creation of furfural and the formaldehyde reaction improve the dimensional stability of the finished board.

The pressure in the head press depends on the type of board. Maximum pressure is employed initially in order to close the press as soon as possible. When the board has been reduced to its required thickness, the pressure is relaxed but not to the point where the press can open. Heavy boards require an initial pressure of 700 p. s. i. which is reduced to about 200 p. s. i. during a period of 15 minutes.

When the press is opened, the finished boards are transported out while the polished plates return to the prepress feeding belt. The boards are separated from each other by having supports placed between them and are then cooled by blowing cool air between the boards. Such boards are in condition to be used in their present state.

As an optional step the finished boards may be additionally conditioned as follows:

It has been found that the boards in service over a period of time, usually attain an average moisture content of from 8 to 13%. During the pressing process the board loses moisture until its content is down to only 2 to 3%. This drying occurs while the shives are fixed in position by great pressure, which prevents shrinkage in directions parallel to the plane of the greatest areas of the shive, so the dry shives have about the same length as the original humid ones and they are fixed in this state by the adhesive. If the board regains its normal humidity, there is very little change in the width or length of the board. However, soaking with water in 24 hours will increase the thickness about 11%. It is obvious that this is a great improvement over ordinary wood chip board where soaking with water for 24 hours produces an increase in thickness of about 30%. However, it is often desirable to improve the stability of the thickness dimension of the board.

To do so, the board is soaked in water, which may also include additional impregnating chemicals. Alternately the surfaces of the board may be sprayed with the same liquids in which case the boards are permitted to stand for 10 or more days. Boards treated by such soaking or spraying have rough surfaces and they are planed by a rotary planer or sanded on their largest surfaces to give them a flat and smooth surface and to produce the desired finished thickness dimension.

Subsequent soaking of such treated boards in water for 24 hours produces an increase in thickness of less than 2%.

The water in which the boards are soaked may contain various additives such as preservative materials, fireproofing materials, etc. Acidity in the board may be neutralized by having free ammonia available in the water. The reaction between the free ammonia and any residual formaldehyde in the adhesive generates a corrosion inhibitor. This prevents nails and screws that are driven into the board from being corroded. Benzoates may also be added to the soaking water to control corrosion.

Although the invention has been described in considerable detail with reference to the use of certain preferred procedures and materials, it will be understood that numerous modifications and variations may be effected therein without departing from the spirit and scope of the invention as defined in the appended claims.

What is claimed is:

1. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, oriented in the board with their flat surfaces generally parallel to each other and having such flat surfaces bonded together with an adhesive, said shives having a specific surface of 150 cm.$^2$/gr. and above.

2. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, oriented in the board with their flat surfaces generally parallel to each other and having such flat surfaces bonded together with a thermosetting binder resin.

3. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, oriented in the board with their flat surfaces generally parallel to each other and having such flat surfaces bonded together with about 5% by dry weight of an adhesive.

4. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, oriented in the board with their flat surfaces generally parallel to each other and having such flat surfaces bonded together with about 5% by dry weight of a thermosetting binder resin.

5. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, oriented in the board with their flat surfaces generally parallel to each other and having such flat surfaces bonded together with about 5% by dry weight of a thermosetting binder resin of the urea-formaldehyde type.

6. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, generally oriented in the board with their largest areas parallel to the largest areas of the board and having their largest areas bonded together with an adhesive.

7. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, generally oriented in the board with their largest areas parallel to the largest areas of the board and having their largest areas bonded together with an adhesive comprising about 5% of the weight of the board.

8. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, generally oriented with respect to the board, with their greatest surfaces parallel to the greatest surfaces of the board and with respect to each other, with their greatest surfaces generally parallel, each shive being randomly oriented, with respect to the board and other shives, in the plane of its greatest surface and overlapping the greatest surfaces of neighboring shives and being bonded to its neighboring shives at said overlapping greatest surfaces.

9. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of several capillary tubes for absorption of adhesive, generally oriented with respect to the board with their greatest surfaces parallel to the greatest surfaces of the board and with respect to each other with their greatest surfaces generally parallel, each shive being randomly oriented, with respect to the board and other shives, in the plane of its greatest surface and overlapping the greatest surface of neighboring shives and being bonded by an adhesive to its neighboring shives at said overlapping greatest surfaces, the total dry weight of said adhesive comprising about 5% of the weight of the board.

10. A structural board comprising a plurality of flat flax shives substantially free from flax fibers, each shive comprising a section of the woody portion of the stem of the flax plant, with the capillary tubes and connective matter substantially intact and having faces and side edges definedl by substantially unbroken capillary tubes and characterized by presenting a minimum of severed capillary tubes for absorption of adhesive, having their greatest surfaces oriented generally parallel to each other and to the greatest surfaces of the board, said shives being randomly oriented with respect to each other in the plane of their greatest surfaces, whereby the greatest surfaces of neighboring shives overlap and contact each other, said shives being bonded to each other at said overlapping and contacting surfaces.

11. A structural board comprising a plurality of flat flax shives substantially free from flax fibers, each shive comprising a section of the woody portion of the stem of the flax plant, with the capillary tubes and connective matter substantially intact and having faces and side edges defined by substantially unbroken capillary tubes and characterized by presenting a minimum of severed capillary tubes for absorption of adhesive, having their greatest surfaces oriented generally parallel to each other and to the greatest surfaces of the board, said shives being randomly oriented with respect to each other in the plane of their greatest surfaces, whereby the greatest surfaces of the neighboring shives overlap and contact each other, said shives being bonded by an adhesive to each other at said overlapping and contacting surfaces, the total dry weight of said adhesive comprising about 5% of the weight of the board.

12. A structural board comprising a plurality of thin flat lamellae bonded together with an adhesive, said lamellae being obtained from the woody portion of the stem of the flax plant each of said lamellae having faces and sides defined by substantially unbroken capillary tubes, and being relatively free of hydrolyzable matter and relatively free of flax fibers and relatively free of exposed tubes of capillary size, except at the ends of each lamella, whereby a relatively small amount of adhesive is required to bond the lamellae to each other.

References Cited in the file of this patent

UNITED STATES PATENTS

| | | |
|---|---|---|
| 908,681 | Lappen | Jan. 5, 1909 |
| 1,225,443 | Lappen | May 8, 1917 |
| 1,365,878 | Weiss | Jan. 18, 1921 |
| 1,450,582 | Dorn | Apr. 3, 1923 |
| 1,523,105 | Doe | Jan. 13, 1925 |
| 2,078,269 | Nevin | Apr. 27, 1937 |
| 2,084,272 | Auchterlonie | June 15, 1937 |
| 2,120,585 | Weelands | June 14, 1938 |
| 2,397,936 | Glidden et al. | Apr. 9, 1946 |
| 2,446,304 | Roman | Aug. 3, 1948 |
| 2,520,100 | Morfit | Aug. 22, 1950 |
| 2,610,138 | Heritage | Sept. 9, 1952 |
| 2,642,371 | Fahrni | June 16, 1953 |